United States Patent [19]

Cevolini et al.

[11] Patent Number: 5,178,220

[45] Date of Patent: Jan. 12, 1993

[54] DEVICE FOR CONTROLLING THE ATTITUDE OF AN IMPLEMENT DRAWN BY AN AGRICULTURAL MACHINE

[75] Inventors: Alfredo Cevolini; Carlo Sedoni, both of Modena, Italy

[73] Assignee: Fiatgeotech-Technologie Per La Terra, Modena, Italy

[21] Appl. No.: 619,959

[22] Filed: Nov. 30, 1990

[30] Foreign Application Priority Data

Dec. 13, 1989 [IT] Italy .................. 3761-A/89

[51] Int. Cl.⁵ .................. A01B 63/112; A01B 63/111
[52] U.S. Cl. ........................... 172/12; 172/7;
172/239; 172/261; 73/862.57
[58] Field of Search .................. 172/7, 11, 239, 10,
172/12, 261; 280/446.1; 73/862.54, 862.59,
862.64, 862.57

[56] References Cited

U.S. PATENT DOCUMENTS

| | | | |
|---|---|---|---|
| 4,215,570 | 8/1980 | Eer Nisse | 73/862.59 |
| 4,367,656 | 1/1983 | Fritsch | 73/862.57 |
| 4,456,074 | 6/1984 | Prudenziati | 172/7 |
| 4,612,995 | 9/1986 | Benedek et al. | 172/7 |
| 4,640,368 | 2/1987 | Kittle et al. | 172/7 |
| 4,721,001 | 1/1988 | Hesse et al. | 172/7 |
| 4,735,103 | 4/1988 | Mussard et al. | 73/862.59 |
| 4,858,475 | 8/1989 | Jacobson | 73/862.54 |
| 4,932,253 | 6/1990 | McCoy | 73/862.54 |

FOREIGN PATENT DOCUMENTS

| | | | |
|---|---|---|---|
| 2133557 | 7/1984 | United Kingdom | 172/7 |
| 88915 | 9/1983 | European Pat. Off. | 172/7 |
| 154728 | 9/1985 | European Pat. Off. | |
| 3433739 | 3/1976 | Fed. Rep. of Germany | 172/7 |
| 3700835 | 7/1988 | Fed. Rep. of Germany | 172/7 |
| 1319621 | 6/1973 | United Kingdom | |

Primary Examiner—Dennis L. Taylor
Assistant Examiner—Spencer Warnick
Attorney, Agent, or Firm—Shlesinger, Arkwright & Garvey

[57] ABSTRACT

The device is mounted in an agricultural machine comprising two links for drawing an implement, a lifter member and a central control unit for controlling the member. The device comprises: two horizontal bars carried in the form of brackets from the chassis of the machine; and four resistive elements deposited on flat faces of the bars symmetrically with respect to a neutral axis defined in this latter, made of a material having an electrical resistance proportional to the deformations to which they are subject and connected in a Wheatstone bridge circuit in such a way such that this arrangement generates an electrical signal proportional to the imbalance of the bridge caused by the deformations to which the elements are subjected, and which are transmitted from the traction force on the implement.

22 Claims, 3 Drawing Sheets

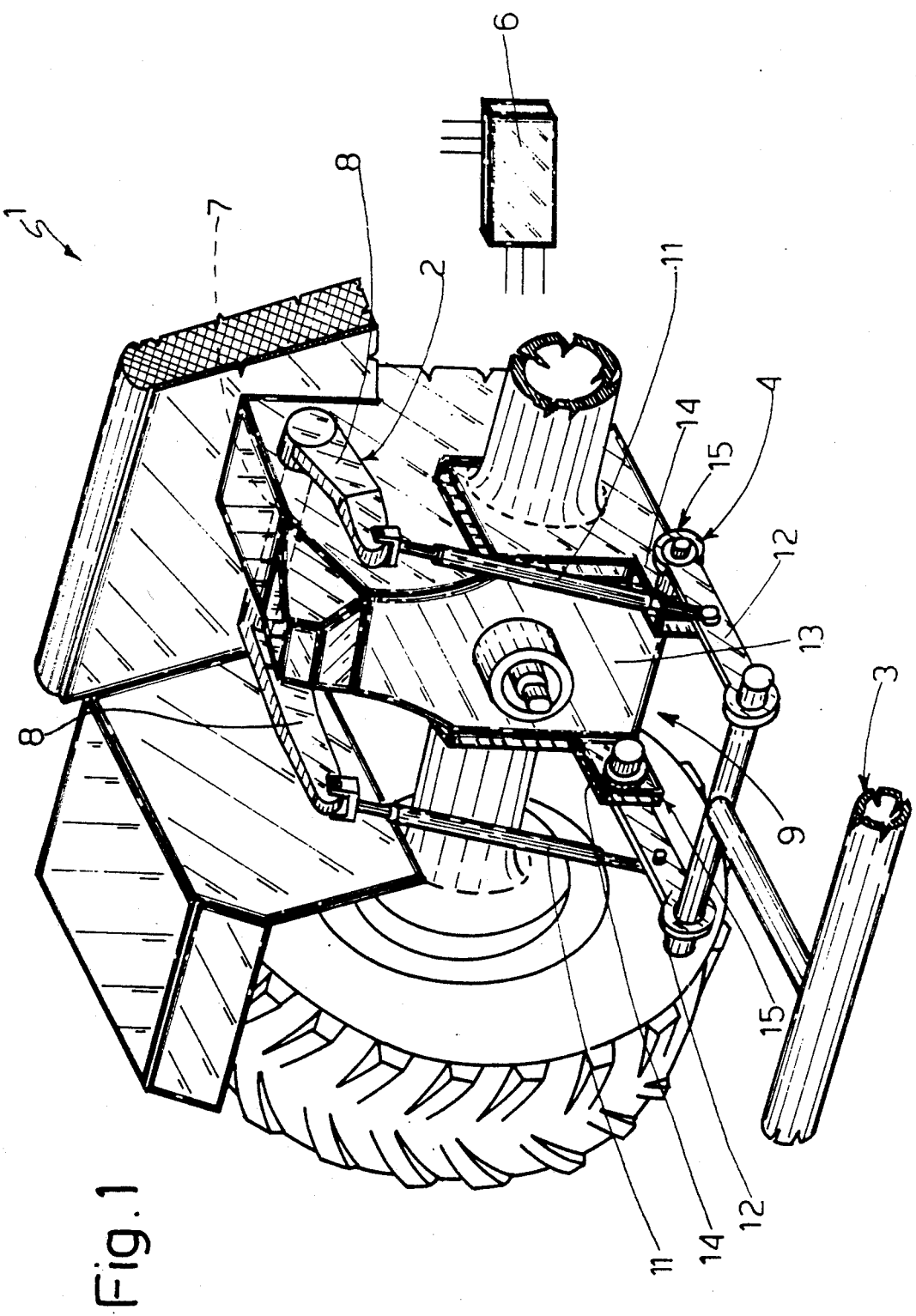

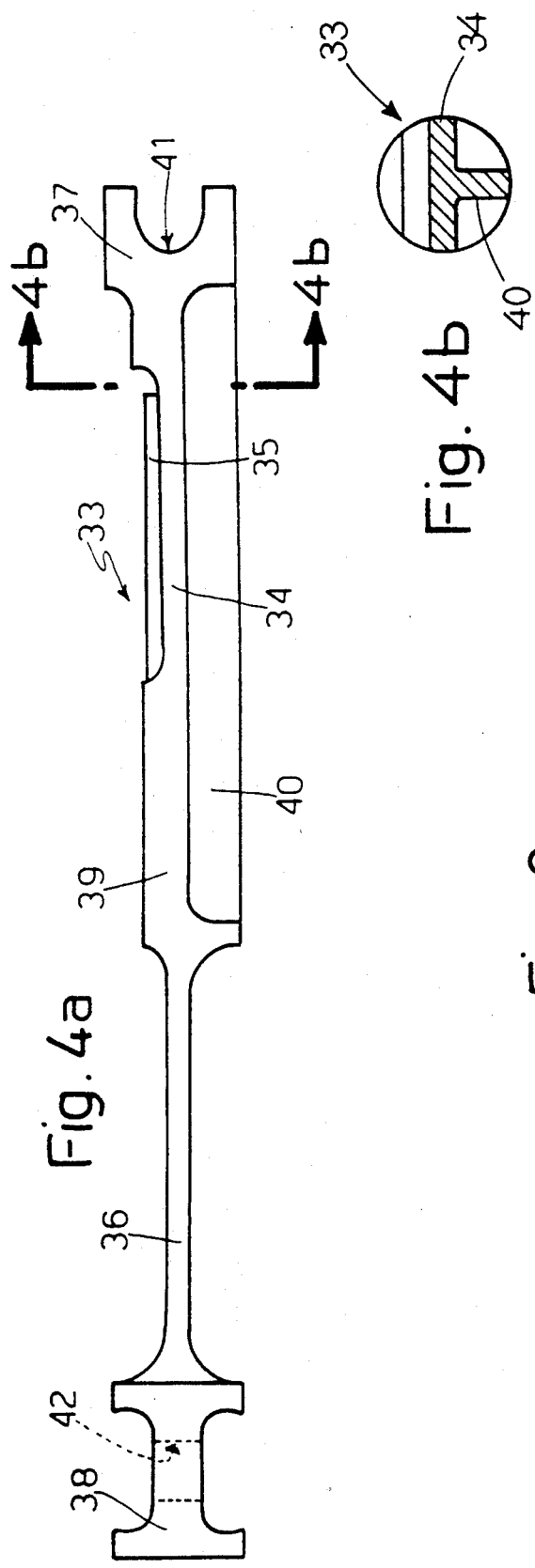
Fig. 4a
Fig. 4b
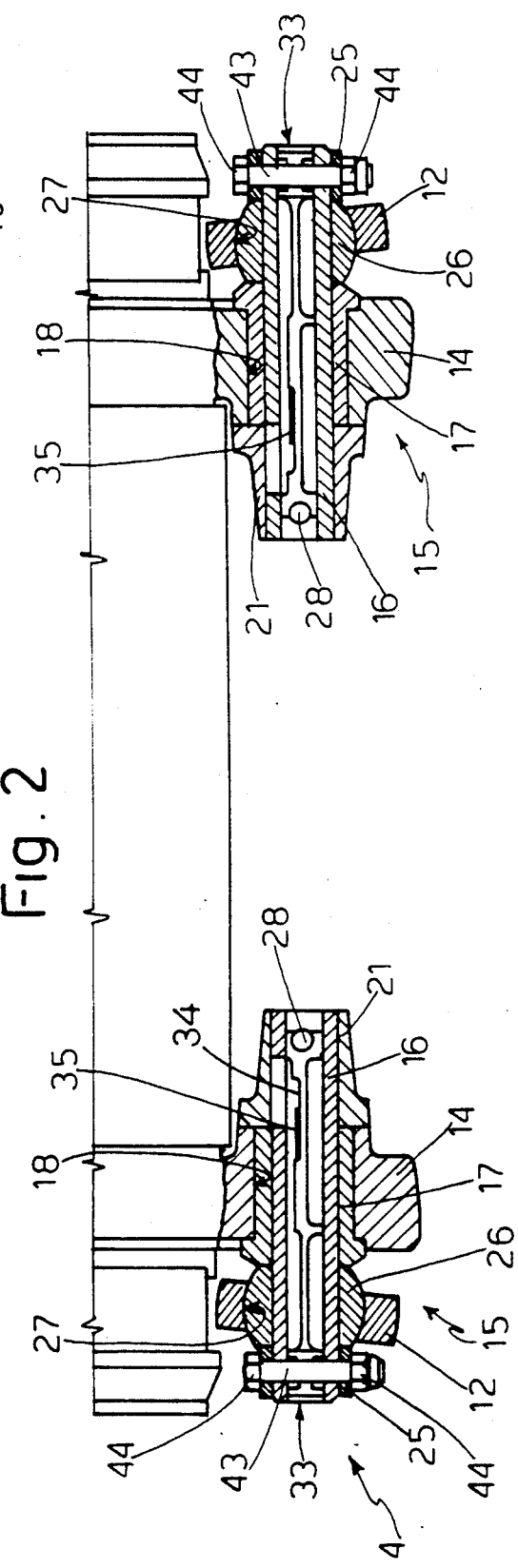
Fig. 2

DEVICE FOR CONTROLLING THE ATTITUDE OF AN IMPLEMENT DRAWN BY AN AGRICULTURAL MACHINE

BACKGROUND OF THE INVENTION

The present invention relates to a device for controlling the attitude of an implement drawn by an agricultural machine.

Devices of the above-indicated type allow the attitude of the implement to be automatically controlled on the basis of the detection of the force which acts on the tool attachment so as to optimize the performance of the agricultural machine, that is to distribute the power of the machine correctly between the function of drawing or supporting the implement and the function of positioning the implement at a predetermined depth in the furrow being worked.

At present such devices have an electrical circuit constituted by four resistive elements fixed to a portion of a bar forming part of the tool attachment. These resistive elements are made of a material which has an electrical resistance value proportional to the expansion and contraction to which the elements themselves are subjected. These are connected in a Wheatstone bridge circuit in such a way that the mechanical stress due to the implement causes an imbalance of the bridge circuit to generate an electrical signal proportional to this imbalance and therefore to the mechanical stress. The electrical signal is then sent, via a signal amplifier circuit, to a central processing unit which forms part of a control system able to command raising and lowering of the implement, that is to say its attitude in relation to the desired working depth, the hardness of the ground and the power of the machine. The above-described devices have various disadvantages.

In particular it is to be noted that the bar is normally made of hardened steel so that significant difficulties must be overcome for the deposition of the resistive element in that the working stages for hardening the bar are contradictory with any further surface treatment such as the deposition of the resistive elements. Relative sliding can occur between the bar and the supports of the resistive elements, which causes the phenomenon of mechanical hysteresis and therefore a spurious electrical signal. It is to be noted that the resistive elements are deposited two on one face and two on the opposite face of the bar. This involves the production of several housing seats for the resistive elements the assembly of which takes place manually since there are no machine tools which can succeed in performing this assembly operation. Consequently errors in positioning the resistive elements can arise which cause errors in the electrical signal, which must therefore be compensated after assembly with a variation in the gain of the amplification circuit. Moreover, again after assembly has been completed, balancing of the Wheatstone bridge must be effected. Such devices are therefore difficult to assemble and once mounted must in general be recalibrated and adjusted, which involves high costs and extended times. Finally, it is to be noted that the electrical connections between the various resistive elements and between these and the amplification circuit are made with flying conductors, which involves a reduced protection of these, a lower durability due to wear (possible mechanical stresses and contacts with dust, oil and anything else which succeeds in entering into the protective casing) to which these are subject, the need for soldering to be effected during assembly, and in general a reduced reliability of the whole electrical installation.

SUMMARY OF THE INVENTION

The object of the present invention is that of providing a device for controlling the attitude of an implement drawn by an agricultural machine, which will be free from the above-specified disadvantages.

According to the present invention there is provided a device for controlling the attitude of an implement drawn by an agricultural machine which comprises two links for mechanical connection between a rear part of its chassis and the implement, a member for raising and lowering the implement, and an electronic central processing unit for controlling the member, characterized by the fact that it comprises:

two horizontal bars extending from the rear part of the said chassis and having a horizontal flat face;

two couplings for mechanical connection of the bars to the links; and four resistive elements deposited coplanar with the flat face of each of the bars in a symmetrical arrangement with respect to a neutral axis orthogonal to the direction of traction, made of a material, preferably of the thick film type, having an electrical resistance value proportional to deformation caused by a force of traction transmitted from the implement via the connection links, and connected in a Wheatstone bridge circuit in such a way that this circuit arrangement generates an electrical signal, to be sent to the said central processing unit, proportional to the resistive imbalance of the said bridge caused by the deformations to which the elements are subjected and which are transmitted from the force of traction of the implement.

BRIEF DESCRIPTION OF THE DRAWINGS

For a better understanding of the present invention a preferred embodiment will now be described, purely by way of non-limitative example, with reference to the attached drawings, in which:

FIG. 1 is a partial perspective view of an agricultural machine provided with a drawn implement and in which there is installed a device formed according to the principles of the present invention;

FIG. 2 is a partially sectioned rear view partly in elevation of the device of the invention fitted to the machine of FIG. 1;

FIG. 4a is a side view of one element of the portion of FIG. 3;

FIG. 4b is a sectional view taken along line 4b—4b in FIG. 4a.

DETAILED DESCRIPTION OF THE INVENTION

Figure 3:
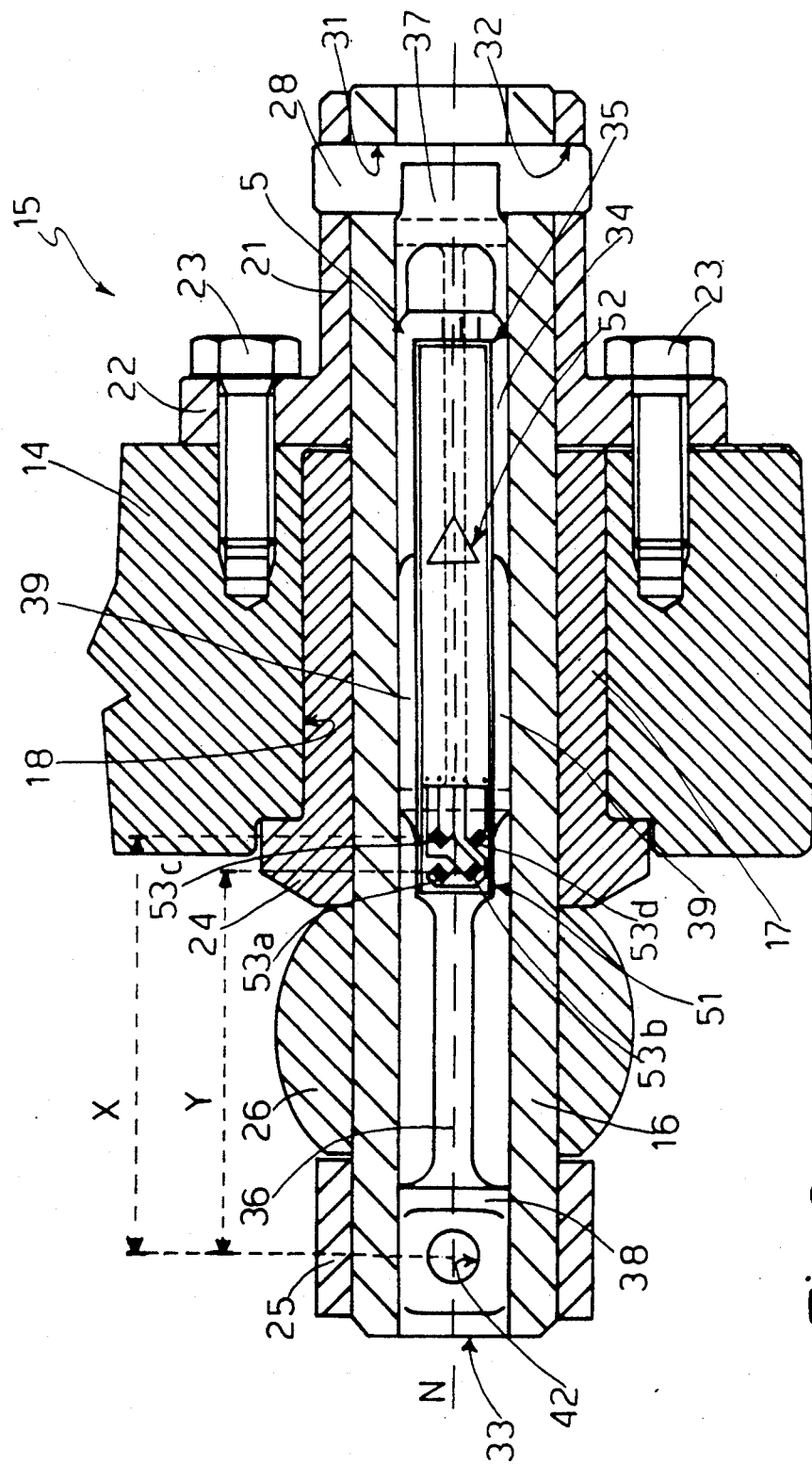
FIG. 3 is a plan view in section of a portion of the device of FIG. 2.

As illustrated in FIG. 1 an agricultural machine is generally indicated with the reference numeral 1, and is provided with a device 2 of the known type for raising and lowering an implement 3 which is illustrated only partly. The machine 1 is further provided with a device 4 for controlling the attitude of the implement 3 which can be drawn or carried by the machine 1. The device 4 comprises an electric circuit (FIG. 3) adapted to generate an electrical signal corresponding to the force exerted by the implement 3 on the machine 1 and to direct this electrical signal to the central electronic processor 6 which, if the force exceeds a predetermined threshold value, is adapted to control the raising of the implement 3 by means of the device 2. The device 2 essentially comprises a rotating bar 7, two arms 8 angularly fixed to the bar 7, two substantially vertical links 11 pivoted at their upper ends to a respective arm 8 and pivoted at their lower end to an intermediate portion of an associated substantially horizontal link 12 extending from the implement 3, and a member (normally of hydraulic type and not illustrated since it is of the known type) controlled by the central processor 6 and adapted to control the rotation in one direction or the other of the bar 7. With reference to FIGS. 1 and 2, from the rear part 13 of a chassis 9 of the machine 1 there project two plates 14, preferably made of cast iron and each of which supports an associated portion 15 of the device 4. The plates 14 are disposed in vertical planes parallel to one another.

As illustrated in FIGS. 2 and 3 each portion 15 comprises an internally hollow cylindrical pin 16 a central part of which is housed, by means of the interposition of a reinforcing bush 17, within a through hole 18 formed in the corresponding plate 14. The pin 16 has two lateral parts outside the hole 18 which will be termed respectively the internal and the external part. The internal lateral part extends towards the mid-line of the machine 1 within a sleeve 21 which has a flange 22 fixed by screws 23 to the plate 14. The outer lateral part extends exteriorly of the machine 1 and fitted to it, by an annular projection 24 formed in the bush 17 and a shoulder ring 25, is a swivel ball 26 which engages in a spherical hole 27 formed at one end of the link 12. The pin 16 and the sleeve 21 are joined fixedly together by means of a peg 28 which engages a diametral hole 31 formed at the free end of the internal lateral part of the pin 16 and a diametral hole 32 formed in the sleeve 21.

With reference to FIGS. 3 and 4, within the pin 16 is housed a bar 33 preferably made of aluminium alloy. The bar 33 has an intermediate portion constituted by a flat plate 34 defined on a horizontal plane, that is parallel to the ground. The plate 34 has a width substantially equal to the internal diameter of the pin 16 and in particular has its lateral edges rounded to form as great as possible contact surface with the internal surface of the pin 16. On the upper face of the plate 34 there is fixed, by adhesive, a flat small plate 35 of aluminium oxide (alumina) on which the electronic circuit 5 is formed, for example by a printed circuit technique. In this respect an associated projection 39 extends upwardly from sections of two lateral edges of the plate 34, which projections define, internally a seat for the plate 35, and externally follow the rounding of the lateral edges. From the central region of the lower face of the plate 34 extends a reinforcing rib 40 which comes into contact with the internal surface of the pin 16 and which also has a rounded edge. The plate 34 has a longitudinal extent such as to bring it into correspondence with the space defined by the bush 17 and a region of the sleeve 21. The bar 33 includes a second intermediate portion constituted by a plate 36 coplanar with the plate 34 but of smaller width. The plate 36 has a longitudinal extent such as to lie in correspondence with the space defined by the swivel ball 26. The bar 33 finally includes two substantially cylindrical end portions 37 and 38. The portion 37 lies in correspondence with the peg 28 and has at its head a through slot 41 to allow the passage of this peg 28. The portion 38 lies in correspondence with the shoulder ring 25 and has a diametral through hole 42 traversed by a threaded bolt 43 which also traverses a diametral hole formed in the pin 16 and a diametral hole formed in the shoulder ring 25. At the two ends of the bolt 43 are screwed respective fixing nuts 44. The bar 33 is fixed by adhesive to the pin 16 and in particular the adhesive is distributed along the whole of the contact surfaces described above, between the bar 34 and the pin 16.

As illustrated in FIG. 3, the electronic circuit 5 includes a resistive block 51 which lies in correspondence with the annular projection 24 of the bush 17 and an amplifier block 52 adapted to amplify the electrical signal generated by the resistive block 51 and to direct the amplified signal to the central processing unit 6. The amplifier block 52 is schematically indicated with an ideogram in that it is a common amplifier of known type. The resistive block 51 comprises four extensible resistive elements 53 of the thick film type made of a material having an electrical resistance value proportional to the expansion or contraction to which this material is subjected. Indicating the central longitudinal axis of the plate 34 orthogonal to the direction of traction with the reference N, it is to be noted that the resistive elements 53 are deposited on the plate 35 in a symmetrical manner with respect to this neutral axis N and thus two elements 53 lie on one side and the other two on the opposite side. It is further to be noted that in this example the four resistive elements 53 overall assume a "herringbone" disposition and in particular the longitudinal axis of the elements 53 define an angle of 45° with respect to the axis N. More precisely the longitudinal axes of the elements 53 converge on the axis N towards the outer lateral part of the pin 16. The circuit arrangement in which the elements 53 are connected is that known as a Wheatstone bridge which, as is known, has a four sided network each side of which provides a resistance. This circuit arrangement is widely known; if all the resistances have the same value the bridge is balanced and therefore does not generate any electrical signal, whilst if the resistances have different values the bridge becomes unbalanced and generates an electrical signal proportional to the imbalance.

In use, when the implement 3 transmits a component of the force of traction via the link 12 to the pin 16, this latter flexes and causes an equal flexure of the bar 33. The deflection of this causes expansion of the elements 53 disposed, with respect to the neutral axis N, on the side closest to the chassis 9 of the machine 1 and contraction of the elements 53 opposite thereto. All this causes an imbalance of the Wheatstone bridge proportional to the traction force exerted by the implement and this imbalances causes generation of an electrical signal of proportional value, which after having been amplified is compared in the central processor unit 6 with a predetermined threshold value in such a way that, on the basis of this comparison, it can control the device 2 for raising the implement 3. The stress transmitted to the elements 53 can be decomposed into components of bending, shear, tension and torsion. It will be evident that the arrangement of the elements 53 on the same horizontal plane and at 45° with respect to the neutral axis N makes it possible simultaneously to measure the components of flexure and shear which have a different value for the elements 53. The tension and torsion components for the arrangement of the elements 53 are equal for all of these and therefore the bridge compensates and thereby eliminates them. It can therefore be stated that the stresses to which the elements 53 are subjected, and which are usable for computation of the imbalance of the bridge are:

$$Sa = (\cos \alpha \cdot Kb \cdot Y + Ks) \cdot Feq$$

$$Sb = -(\cos \beta \cdot Kb \cdot Y + Ks) \cdot Feq$$

$$Sc = (\cos \alpha \cdot Kb \cdot X + Ks) \cdot Feq$$

$$Sd = -(\cos \beta \cdot Kb \cdot X + Ks) \cdot Feq$$

where
- Sa represents the value of the stress applied to the element 53a;
- Sb represents the value of the stress applied to the element 53b;
- Sc represents the value of the stress applied to the element 53c;
- Sd represent the value of the stress applied to the element 53d;
- $\alpha$ represents the angle between the longitudinal axis of the elements 53a and 53c and the neutral axis N;
- $\beta$ represents the angle between the longitudinal axis of the elements 53b and 53d and the neutral axis N;
- Feq represents the force equivalent due to the deformation of the pin 16 in the contact zone between this and the end portion 38, and which is along the middle axis of the end portion 38, horizontal and orthogonal to the longitudinal axis of the bar 33;
- Y represents the distance between the center-of-gravity of the elements 53a and 53b and the network along which Feq is applied;
- X represents the distance between the center-of-gravity of the elements 53c and 53d and the network along which Feq is applied;
- Kb represents a coefficient relating to the flexural deformation of the elements 53 and is a function of the mechanical geometry of the various parts of the portion 15 of the device 4, the geometry of the arrangement of the elements 53, the coefficient of elasticity of the bar 33 and the plate 35, and the coefficient of proportionality between the deformation and electrical resistance of the elements 53;
- and Ks represents a coefficient relating to the deformation in sheet of the elements 53 and is a function of the same order of magnitude as the coefficient Kb.

From what has been described the numerous advantages achieved with the arrangement of the present invention will be evident.

In particular the device 4 has the member on which stress transmitted from the implement 3 is applied and which carries the plate 35, which works as a bracket and which therefore permits a greater precision for the detection of the flexing stress. This member (bar 33) is made in aluminium alloy and therefore can be produced by die casting with evident reduction in costs, also bearing in mind that this does not necessitate particular finishing operations or working. Moreover, relative sliding or friction between the various parts thereof are avoided by the conformation of the device 4 and therefore mechanical hysteresis phenomena are absent.

The electrical circuit 5 is made on a flat plate, which permits the disposition of the elements 55 on the same flat face and a rapid and simplified assembly of the plate 35 which can be achieved by automatic machines. This assembly has the above-listed advantages in that the plate 35 is carried by a flat plate in which, by means of the projections 39, there are defined very precise references which delimit the housing seats for the plate 35. A correct positioning of the plate 35 and, above all, a precise positioning of the elements 53 with respect to the neutral axis N is therefore achieved. Errors in the electrical signal are therefore avoided and consequently after assembly has been completed, it is not necessary to vary the gain of the amplifier circuit to compensate such errors in the signals. The formation of the circuit 5 on the plate 35 permits the production of this utilizing current techniques for production of electronic boards which as is known provide for a precise production by means of automatic machines in relatively short times on an industrial scale and with very much reduced cost. It is to be underlined that the balancing of the Wheatstone bridge and possible adjustments or calibrations of the amplifier circuit are achieved on the plate 35 before it is mounted on the bar 33 and in particular during construction thereof. Consequently after assembly of the plate 35 onto the bar 33 it is not necessary, as was necessary in prior art devices, to perform operations for testing the correct functioning of the circuit 5.

It is also to be noted that both the resistive block 51 and the amplification block 52 are made on the same plate and therefore the electrical connections are defined by electrically conductive tracks and not by flying wires. Naturally an electrical connection cable to the central processing unit 6 will however still be required. The extreme closeness between the two blocks 51 and 52 allows amplifications with high gain without creating appreciable distortions in the signal. Such distortions are inhibited also by the fact that the circuit 5 is within a consistent metallic mass which acts as a screen and therefore helps to prevent the circuit 5 from being subjected to perturbations caused by spurious signals of electro-magnetic origin.

Finally, as already noted, the arrangement of the elements 53 permits the imbalance of the Wheatstone bridge to be solely by bending and sheer deformations without having to take into account possible components of tension and torsion.

Finally it is clear that the device 4 described and illustrated here can have modifications and variations introduced thereto without by this departing from the protective ambit of the present invention.

We claim:

1. A device for controlling the attitude of an implement drawn by an agricultural machine which includes a chassis, two mechanical connecting links between a rear part of the chassis and the implement, a member for raising and lowering the implement, and a central electronic processing unit for controlling the member, said attitude controlling device comprising:
   a) two horizontal bars extending substantially orthogonally from the rear part of the chassis, each having a horizontal flat face;
   b) two hollow pins for housing a corresponding bar;
   c) two mechanical connection couplings disposed between respective ones of said hollow pins and said links, and surrounding a first portion of said respective hollow pin;
   d) two reinforcing bushes, each reinforcing bush surrounding a second portion of a respective hollow pin, said first portion of said hollow pin flexing with respect to said second portion in accordance with a force of traction transmitted from the implement by said connecting links; and e) four resistive elements deposited in a coplanar manner on said flat face of each of said bars and symmetrically arranged with respect to a neutral axis orthogonal to a force of traction transmitted from the implement via the mechanical connecting links, wherein:

f) said resistive elements are made of a material of thick film type, have electrical resistance values proportional to deformation caused by the force of traction, and are connected in a Wheatstone bridge circuit arrangement in such a way that this circuit generates an electrical signal, which can then be sent to the central processing unit, proportional to the resistive imbalance of said bridge caused by the deformations to which said resistive elements are subjected, and said deformations are transmitted by the force of traction of said implement.

2. A device as defined in claim 1, wherein:
a) said resistive elements assume an overall arrangement with respect to said neutral axis of the "herringbone" type, with the longitudinal axes of said resistive elements being at an angle of 45° with respect to said neutral axis; said electrical signal generated by said circuit arrangement being therefore dependent on bending and shearing stresses to which said horizontal bars are subjected.

3. A device as defined in claim 1, wherein:
a) each said bar further includes a flat plate, and said resistive elements are deposited on the flat plate which is fixed to said flat face of said bar.

4. A device as defined in claim 3, wherein:
a) said attitude controlling device further includes an electrical circuit formed on said plate, said electrical circuit including a resistive block constituted by said resistive elements and an amplifier block for amplification of said electrical signal.

5. A device as defined in claim 4, wherein:
a) said electrical circuit is made with a printed circuit technique on said plate.

6. A device as defined in claim 3, wherein:
a) each said bar is made of aluminum alloy, and said plate, fixedly joined to the bar by adhesive, is made of aluminum oxide; said bar being made by die casting.

7. A device as defined in claim 3, wherein:
a) said flat face of said bar has points of reference formed thereon which delimit and define with precision a seat for fixing said plate.

8. A device as defined in claim 1, wherein:
a) each said bar includes a reinforcing rib in contact with surfaces of said hollow pin, adhesive being deposited along respective contact surfaces between said pin and said reinforcing rib of said bar.

9. A device as defined in claim 8, wherein:
a) said attitude controlling device further includes an outer sleeve disposed about each said respective hollow pin;
b) each said pin includes said second portion housed within a through hole formed in an associated plate extending from said chassis, said reinforcing bush being disposed between said second portion and said associated plate; an internal lateral part which extends towards the center line of said machine and which lies within the outer sleeve, said outer sleeve being fixed by screws to said plate; and an outer lateral part which extends from said second portion away from said machine and on which, by means of an annular projection formed in said bush and a shoulder ring, there is fitted the mechanical connection coupling in the form of a swivel ball which engages a hole of spherical shape formed at one end of a respective said link; and
c) each said pin and said respective outer sleeve being fixed together by means of a peg which engages a diametrical hole formed at the free end of said internal lateral part of said pin and a diametrical hole formed in said respective outer sleeve.

10. A device as defined in claim 9, wherein each said bar comprises:
a) a first substantially cylindrical portion lying in communication with said pin peg;
b) a first intermediate portion constituted by a first plate, the upper face of which constitutes said horizontal flat face supporting said elements, having a width substantially equal to the internal diameter of said pin and located within the space defined by said bush disposed between said second portion and said associated plate;
c) a second intermediate portion constituted by a second plate of smaller width than that of said first plate and located within the space defined by said swivel ball of said outer lateral part; and
d) a second substantially cylindrical and portion located within said space defined by said shoulder ring of said outer lateral part.

11. A device for controlling the attitude of an implement drawn by an agricultural machine which includes a chassis, two mechanical connecting links disposed between a rear part of the chassis and the implement, means for raising or lowering the implement, and a central processing unit for controlling the raising or lowering means, said attitude controlling device comprising:
a) two hollow pins, each said hollow pin having a central portion disposed through a respective hole on a respective side of the rear part of the chassis and having a longitudinal axis orthogonal to a force of traction transmitted from the implement by said connecting links;
b) two mechanical couplings each disposed between a respective said connecting link and a first lateral portion of a respective said hollow pin and, said first lateral portion of each said hollow pin flexing with respect to said central portion in accordance with the force of traction;
c) two horizontal bars, each said horizontal bar being housed coaxially within a respective said hollow pin and including a first intermediate portion with a horizontal flat face on one side and a reinforcing rib on the opposite side, and a second intermediate portion of a different thickness housed within said first lateral portion of the respective said hollow pin, said rib contacting the internal surface of said central portion of the respective said hollow pin; and
d) four resistive elements deposited in a coplanar manner only on said horizontal flat face of each said bar and symmetrically arranged about a neutral axis defined by the longitudinal axis of said bars, wherein:
e) said resistive elements are made of a material of the thick film type, have electrical resistance values proportional to deformation caused by the force of traction transmitted from the implement and are connected in a Wheatstone bridge circuit arrangement in such a way that an electrical signal is generated, which can be sent to the central processing unit, proportional to the resistive imbalance of said bridge caused by the deformation.

12. A device as defined in claim 11, further comprising:
a) a first plate attached to each side of the rear part of the chassis;
b) wherein each said hollow pin further includes a cylindrical sleeve and a second lateral portion housed within said cylindrical sleeve; and
c) said hollow pin and said sleeve are fixed together by means of a peg which engages a diametrical hole formed at the free end of said second lateral portion of said hollow pin and a diametrical hole formed in said sleeve.

13. A device as defined in claim 12, wherein:
a) each said bar further includes a first substantially cylindrical end portion lying in correspondence with said peg; and
b) said second intermediate portion of each said respective bar is of a smaller width than that of said first intermediate portion of said bar.

14. A device as defined in claim 11, wherein:
a) each said horizontal bar further includes a first substantially cylindrical end portion defining a first means for receiving a peg, and a second substantially cylindrical end portion defining second means for receiving a peg; and
b) each hollow pin includes at one end a first hole corresponding to said first means and at the other end a second hole corresponding to said second means, said first and second hole being orthogonal to each other.

15. A device as defined in claim 11, wherein:
a) each said horizontal bar includes an aluminum alloy.

16. A device as defined in claim 11, wherein:
a) each said hollow pin has a substantially circular cross section.

17. A device as defined in claim 11, wherein:
a) each said horizontal bar has an end;
b) each said hollow pin has an end; and
c) said end of said horizontal bar is fixedly connected to said end of said hollow pin.

18. A device for controlling the attitude of an implement drawn by an agricultural machine which includes a chassis, two mechanical connecting links disposed between a rear part of the chassis and the implement, means for raising or lowering the implement, and a central processing unit for controlling the raising or lowering means, said attitude controlling device comprising:
a) a first plate being attached to each side of the rear part of the chassis;
b) two hollow pins, each said hollow pin having a central portion disposed through a respective hole on a respective side of the rear part of the chassis and having a longitudinal axis orthogonal to a force of traction transmitted from the implement by said connecting links;
c) two mechanical couplings each disposed between a respective said connecting link and a first lateral portion of a respective said hollow pin and, said first lateral portion of each said hollow pin flexing with respect to said central portion in accordance with the force of traction;
d) each said hollow pin including a cylindrical sleeve and a second lateral portion housed within said cylindrical sleeve; said hollow pin and said sleeve being fixed together by means of a first peg which engages a diametrical hole formed at the free end of said second lateral portion of said hollow pin and a diametrical hole formed in said sleeve;
e) two horizontal bars, each said horizontal bar being housed coaxially within a respective said hollow pin and including a first intermediate portion with a horizontal flat face on one side and a reinforcing rib on the opposite side, and a second intermediate portion of a different thickness housed within said first lateral portion of the respective said hollow pin, said rib contacting the internal surface of said central portion of the respective said hollow pin; and
f) four resistive elements deposited in a coplanar manner only on said horizontal flat face of each said bar and symmetrically arranged about a neutral axis defined by the longitudinal axis of said bars, wherein:
g) said resistive elements are made of a material of the thick film type, have electrical resistance values proportional to deformation caused by the force of traction transmitted from the implement and are connected in a Wheatstone bridge circuit arrangement in such a way that an electrical signal is generated, which can be sent to the central processing unit, proportional to the resistive imbalance of said bridge caused by the deformation.

19. A device as defined in claim 18, wherein:
a) each said bar further includes a first substantially cylindrical end portion lying in correspondence with said first peg; and
b) said second intermediate portion of each said respective bar is of a smaller width than that of said first intermediate portion of said bar.

20. A device as defined in claim 18, wherein:
a) each said horizontal bar further includes a first substantially cylindrical end portion defining a first means for receiving said first peg, and a second substantially cylindrical end portion defining second means for receiving a second peg; and
b) each hollow pin includes at one end a first hole corresponding to said first means and at the other end a second hole corresponding to said second means, said first and second hole being orthogonal to each other.

21. A device for controlling the attitude of an implement drawn by an agricultural machine which includes a chassis, two mechanical connecting links disposed between a rear part of the chassis and the implement, means for raising or lowering the implement, and a central processing unit for controlling the raising or lowering means, said attitude controlling device comprising:
a) two hollow pins, each said hollow pin having a central portion disposed through a respective hole on a respective side of the rear part of the chassis and having a longitudinal axis orthogonal to a force of traction transmitted from the implement by said connecting links;
b) two mechanical couplings each disposed between a respective said connecting link and a first lateral portion of a respective said hollow pin and, said first lateral portion of each said hollow pin flexing with respect to said central portion in accordance with the force of traction;

c) two horizontal bars, each said horizontal bar being housed coaxially within a respective said hollow pin and including a first intermediate portion with a horizontal flat face on one side and a reinforcing rib on the opposite side, and a second intermediate portion of a different thickness housed within said first lateral portion of the respective said hollow pin, said rib contacting the internal surface of said central portion of the respective said hollow pin;

d) said horizontal flat face being disposed in a horizontal plane substantially orthogonal to the force of traction;

e) resistive elements deposited in a coplanar manner only on said one side having said horizontal flat face of each said bar and symmetrically arranged about a neutral axis defined by the longitudinal axis of said bars, wherein:

f) said resistive elements have electrical resistance values proportional to deformation caused by the force of traction transmitted from the implement and are connected in such a way that an electrical signal is generated, which can be sent to the central processing unit, proportional to the resistive imbalance.

22. A device as defined in claim 21, wherein:

a) four resistive elements are deposited on said horizontal flat face of each said bar.

* * * * *

UNITED STATES PATENT AND TRADEMARK OFFICE
CERTIFICATE OF CORRECTION

PATENT NO.   :   5,178,220
DATED        :   January 12, 1993
INVENTOR(S)  :   Alfredo Cevolini and Carlo Sedoni It is certified that error appears in the above-identified patent and that said Letters Patent is hereby corrected as shown below:

On the title page, Item [73], the Assignee should read:

--FIATGEOTECH-TECNOLOGIE PER LA TERRA S.p.A--.

Signed and Sealed this

Sixth Day of April, 1993

*Attest:*

STEPHEN G. KUNIN

*Attesting Officer*   Acting Commissioner of Patents and Trademarks